(No Model.)
P. B. DONAHOO.
STREET SWEEPER.
No. 469,551. Patented Feb. 23, 1892.
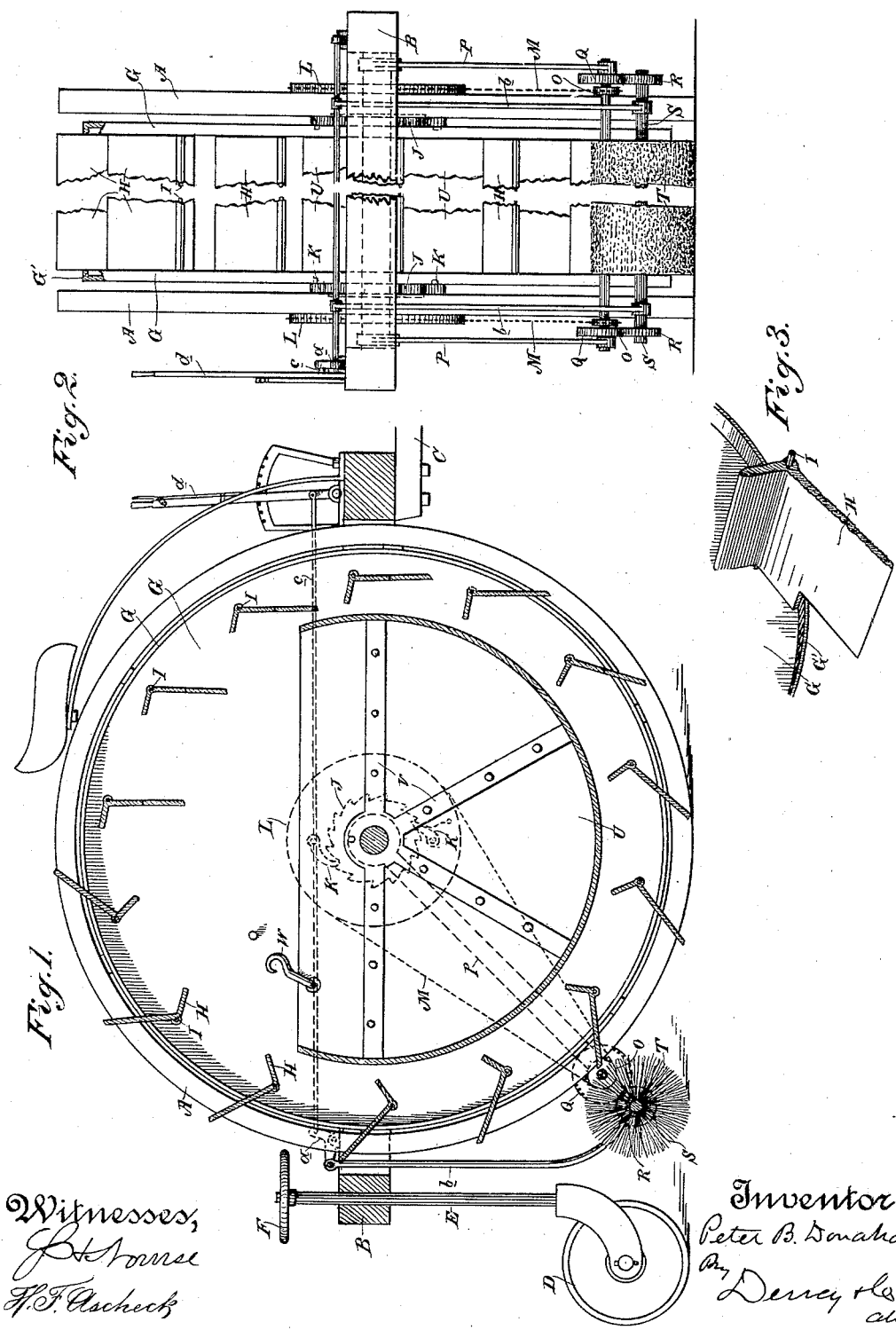

UNITED STATES PATENT OFFICE.

PETER BRYANT DONAHOO, OF FRESNO, CALIFORNIA.

STREET-SWEEPER.

SPECIFICATION forming part of Letters Patent No. 469,551, dated February 23, 1892.

Application filed July 16, 1891. Serial No. 399,753. (No model.)

*To all whom it may concern:*

Be it known that I, PETER BRYANT DONAHOO, a citizen of the United States, residing at Fresno, Fresno county, State of California, have invented an Improvement in Street-Sweepers; and I hereby declare the following to be a full, clear, and exact description of the same.

My invention relates to an improved apparatus for sweeping streets and collecting dust and dirt therefrom.

It consists in certain details of construction, which will be more fully explained by reference to the accompanying drawings, in which—

Figure 1 is a vertical section taken through my apparatus to show the lifting-buckets, the broom and actuating mechanism, and receptacle for dust. Fig. 2 is a rear view of the apparatus. Fig. 3 is a detail view of one of my buckets.

My invention is designed to sweep the dust of the streets, to elevate it by continuously-acting buckets, and to deliver it into a receptacle carried upon the machine by a single continuous operation.

A A are the bearing and driving wheels of the machine, which are journaled upon a suitably-constructed frame B, having a tongue C, with means for attaching the team, if it is to be hauled by a team, or proper supports for an engine or other motor which may be placed upon the apparatus to drive it.

D is a steering-wheel, having the standard E and the hand-wheel or other operating device F. Upon the shaft of the wheels A and between these wheels are loosely journaled disks or plates G, between which the lifting-buckets H extend. These buckets may be made of any suitable shape and material. In the present case I have shown them as constructed of sufficiently stiff steel or iron having pivot-pins I at their angles, these pins extending into suitable holes or journals in the disks G, so that the buckets turn freely upon them. The edges of the disks G are turned inwardly, as shown at G', so as to project slightly beyond the ends of the buckets, and when the buckets drop by gravitation into the position which they occupy below the center of the wheel the edges of the buckets will be supported upon these flanges, and as they pass the lowest point of their travel these edges will be approximately close to or upon the ground.

J are ratchet-wheels, which are fixed to the outer sides of these disks G, and K are pawls fixed to the inner faces of the bearing and driving wheels A or other suitable or convenient arrangement of pawl-and-ratchet or clutch mechanism may be adopted, whereby the disks which carry the buckets are caused to move in unison with the outer bearing-wheels when traveling in a straight line; but if the machine turns or travels in a curve, where one wheel moves faster than the other, the pawl-and-ratchet mechanism will allow the inner wheel to travel more slowly, while the outer wheel gives the impulse to move the disks and buckets. I have here shown a pawl-and-ratchet mechanism for this purpose; but it will be manifest that any of the usual or well-known devices for producing this action may be applied as found most convenient.

Upon the outer sides of the driving-wheels A are fixed sprocket-wheels L, and around these wheels the chains M pass extending to corresponding sprocket-wheels O upon a shaft which is journaled to the rear and near the surface of the ground.

P P are radial arms extending from the main wheel-axle downward and backward and supporting the shaft of the sprocket-wheels O, which is journaled in the ends of these radial arms. Upon the same shaft with these sprocket-wheels are fixed the gear-wheels Q, and these engage with pinions R, fixed to the shaft S, upon which the rotary cylindrical broom T is carried. This intermediate gear enables me to give the proper direction and rate of speed to the broom. It will be manifest that by this construction, when the machine is moved forward, power transmitted through the chain M and the gears Q and R will cause the broom to rotate with any desired degree of speed, depending upon the relative size of the driving-gears, and this broom in its rotation sweeps the dirt toward and into the buckets H, the edges of which, as before described, are in close proximity with the surface of the ground. As these outer edges are supported by the flanges G' of the disks G, or equivalent stops, they will remain in the proper position to retain the dust which has been swept into them until they reach a position above the plane of the axle and near the top of their arc of travel, when they will reverse by gravitation and discharge their load. This is received in a segmental drum U, which is formed of thin sheet metal or other material, open at the top, so that the dirt or dust may fall directly into it from the buckets as they pass above it. This segmental drum is suspended upon the main axle, which turns loosely so that the drum maintains its upright position.

Suitable strengthening-braces V are fixed in the heads or ends of the drum, which are riveted to them so as to give it sufficient rigidity.

When the drum has become sufficiently filled with dirt, it is discharged by connecting the drum with some part of the many rotating wheels or disks by means of the hooks W, fixed upon the ends of the drum to which the attachment is secured. Whenever it is desired to raise the broom from the street-surface, it is done by means of a bell-crank lever $a$, suitably fulcrumed upon the frame, having the links $b$, connecting it with the frame-work in which the shaft of the broom is journaled. A connecting-rod $c$ extends from one arm of the bell-crank lever forward and is connected with an operating-lever $d$, conveniently located with reference to the driver's seat and held in any desired position by the usual segment-rack. By this construction I am enabled to provide a very efficient sweeping apparatus.

Having thus described my invention, what I claim as new, and desire to secure by Letters Patent, is—

1. In a street-sweeeping machine, the bearing-wheels journaled upon an axle, disks turning loosely upon said axle between the bearing-wheels, having inwardly-turned flanges against which the buckets are supported, said buckets, pawl-and-ratchet mechanisms by which power to rotate the disks is derived from either of the main wheels, independently-angular buckets between the disks around the periphery, having journal-pins upon which they turn by gravitation, an open-top drum loosely suspended between the disks and within the circle of buckets, and stops upon the periphery of the disks, against which the outer edges of the buckets rest when they pass below the center in their rotation, substantially as herein described.

2. In a street-sweeping machine, the angular buckets extending from side to side, journaled around the peripheries of disks in which they are supported, said buckets having end pins journaled in the disks, a shaft upon which these disks turn, bearing-wheels supporting the shaft, and an intermediate pawl-and-ratchet mechanism through which power is transmitted from the wheels to rotate the disks, a rotary brush supported in rear of the machine, intermediate gears, chains, and sprocket-wheels whereby the brush is rotated to throw the dirt into the buckets as they arrive successively at the lowermost point of their travel, and a segmental drum suspended upon the main axle between the disks and within the circle of the buckets and having its top open and adapted to receive the dirt which falls from the buckets, said buckets automatically discharging themselves as they arrive at the upper portion of their arc of travel, substantially as herein described.

3. In a street-sweeping machine, the revolving buckets and the rotary brush with intermediate mechanism, whereby movement is imparted to the buckets and brush from the main bearing-wheels of the apparatus and dirt is swept from the surface of the street into the buckets as they arrive successively at the lowermost point of their travel, a segmental drum suspended upon the main axle of the machine and open at the top, the carrying-buckets automatically reversible when they arrive at a point above the top of the drum, whereby their contents are discharged into the drum, and hooks or attachments whereby one side of the drum may be connected with the rotating parts of the apparatus to reverse the drum and discharge its contents, substantiallly as herein described.

4. In a street-sweeping machine, the main bearing-wheels, the rotary disks carrying the revolving and automatically-dumping buckets, the pawl-and-ratchet mechanism whereby the disks and buckets are rotated by power derived from the bearing-wheels, a rotary brush with intermediate gearing, chains and sprocket-wheels whereby the brush sweeps the dirt from the ground into the buckets as they successively reach the lower point in their travel, an interior segmental drum suspended from the main shaft and open at the top to receive the dirt which is discharged by the buckets when they reach the upper part of their circle of travel, radial arms by which the brush and its operating mechanism are supported at a constant distance from the central shaft, and a bell-crank-lever connecting-rod, whereby the brush may be raised or lowered, moving about the common center, substantially as herein described.

In witness whereof I have hereunto set my hand.

PETER BRYANT DONAHOO.

Witnesses:
MOODY D. KENNESON,
ROBERT A. ROSE.